United States Patent [19]

Goldstein

[11] Patent Number: 4,702,884

[45] Date of Patent: Oct. 27, 1987

[54] GLASS-LINED PIPES

[75] Inventor: David Goldstein, Adelphi, Md.

[73] Assignee: The United States of America as represented by the Secretary of the Navy, Washington, D.C.

[21] Appl. No.: 887,165

[22] Filed: Jul. 3, 1986

[51] Int. Cl.[4] .............................................. B22F 7/04
[52] U.S. Cl. ........................................ 419/8; 65/59.4;
138/141; 138/143; 428/552; 428/36; 428/433; 428/408
[58] Field of Search ................ 428/36, 433, 408, 552; 65/43, 59.21, 59.22, 59.24, 59.25, 59.4; 174/71 C, 126 R, 126 C; 138/141, 143; 419/8

[56] References Cited

U.S. PATENT DOCUMENTS

| 300,410 | 6/1884 | Tichenor | 174/126 R |
|---|---|---|---|
| 2,308,473 | 1/1943 | Wadman et al. | 138/141 |
| 2,986,847 | 9/1957 | Sato | 138/141 |
| 3,246,973 | 4/1966 | Bange et al. | 65/59.4 |
| 4,311,505 | 1/1982 | Yasui et al. | 65/59.21 |

FOREIGN PATENT DOCUMENTS

| 0586139 | 12/1977 | Japan | 65/59.24 |
|---|---|---|---|
| 0656995 | 4/1979 | Japan | 65/59.24 |
| 0062165 | 5/1980 | Japan | 65/59.21 |

Primary Examiner—John E. Kittle
Assistant Examiner—Beth A. Bozzelli
Attorney, Agent, or Firm—Kenneth E. Walden; Frederick A. Wein; Roger D. Johnson

[57] ABSTRACT

A method of producing a glass-lined metal pipe in which an unconsolidated metal or metal alloy powder is loaded into a sealable glass mold comprising a graphite core, a glass sleeve slipped over the graphite core with a sliding fit, a sealable outer glass envelope surrounding the graphite core and glass sleeve forming with them a sealable chamber for the metal or metal alloy powder, wherein the glass is a type which becomes plastic when heated. The air in the mold is removed under vacuum and the mold is sealed and placed into a free flowing refractory powder in a crucible and consolidated by sintering under atmospheric pressure (CAP ® process). Removal of the glass envelope and the graphite core produces a glass-lined pipe in which the glass liner is slightly fused into and is under compressive force from the surrounding metal pipe.

6 Claims, 3 Drawing Figures

GLASS-LINED PIPES

BACKGROUND OF THE INVENTION

This invention relates to metal pipes and more particularly to glass lined metal pipes.

Most glass-lined pipes are the result of ceramic or glass frits which are sprayed onto metals in thin layers and then fired. These glass liners are not particularly erosion or impact resistant since they are not under compression.

SUMMARY OF THE INVENTION

Accordingly, an object of this invention is to provide a new glass-lined metal pipe structure.

Another object of this invention is to provide glass-lined metal pipes which are resistant to impact shocks.

A further object of this invention is to provide glass-lined pipes which are resistant to thermal shocks.

Yet another object of this invention is to provide a creep resistant glass liner for metal pipes.

A still further object of this invention is to provide an erosion resistant glass-lined metal pipe.

Moreover, another object of this invention is to provide a new method of manufacturing glass-lined metal pipes.

These and other objectives of this invention are achieved by providing:

a method of producing a glass-lined metal pipe comprising:

(a) loading unconsolidated metal or metal alloy powder into a sealable glass mold comprising a graphite core, a glass sleeve slipped over the graphite core with a sliding fit, a sealable outer glass envelope surrounding the graphite core and glass sleeve and forming with them a sealable chamber for the metal or metal alloy powder, wherein the glass is a type which becomes plastic when heated;

(b) evacuating the atmosphere from the metal or metal alloy powder filled chamber in the mold;

(c) sealing the chamber;

(d) placing the mold in an open top refractory container and packing with free flowing refractory powder selected to freely flow at all the temperatures in the process;

(e) heating the mold and the metal or metal alloy contents of the mold to a temperature at which sintering of the metal or metal alloy powder takes place and holding at this temperature for a time sufficient to cause substantially complete densification of the powered metal or metal alloy, during which step the mold is supported by the free flowing refractory powder as the glass sleeve and the glass envelope become plastic and the mold shrinks in volume as its metal or metal alloy contents densify, putting pressure against the plastic glass sleeve which is compressed against the solid graphite core;

(f) cooling and removing the glass envelope portion of the mold to leave a composite article comprising the consolidated metal or metal alloy layer, a glass liner under compression from the consolidated metal or metal alloy layer, a very thin interfacial fused layer of glass and metal or metal alloy, and the graphite core; and (g) removing the solid graphite core from the composite article produced in step (f) to produce the glass-lined metal or metal alloy pipe.

If the graphite core is left in, the composite structure is a co-axial electrical conductor with a dialectric interface.

DETAILED DESCRIPTION OF THE PREFERRED EMBODIMENT

Figure 1:
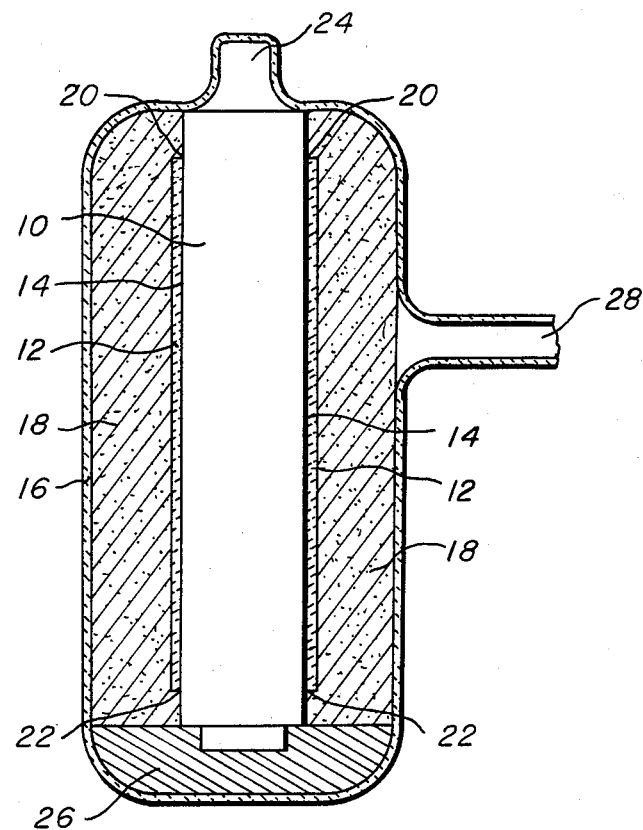
FIG. 1 shows a cross-sectional view of a typical glass envelope mold with graphite core and glass sleeve used in the method of this invention.

Referring now to FIG. 1, a cylindrical glass envelope mold 16 with a port 28 in the envelope 16 is shown. A cylindrical glass sleeve 12 is sliding fitted over a solid cylindrical graphite core 10. The graphite core 10 is centered and held into place by a support boss 24 in the glass envelope 16 at the top and by a graphite plug structure 26 at the bottom. The graphite core 10, glass sleeve 12, graphite plug structure 26, and glass envelope 16 define an annular chamber 18 which is filled with a metal or metal alloy powder through the port 28 in the glass envelope 16.

Note that an interfacial space 14 containing air exists between glass sleeve 12 and the graphite core 10. It is critical that the space 14 is not sealed but rather is open at one or both ends 20 and 22. The interfacial space 14 must be in communication with the annular chamber 18 to allow for the free flow of air from interfacial space 14 into annular chamber 18. This will result in the air pressure in interfacial space 14 between the glass sleeve 12 and the graphite core 10 being identical to the air pressure in the annular chamber 18.

Next the air is removed from chamber 18 (and thus also interfacial space 14) under vacuum through port 28 and the port 28 is sealed. This step may be accompanied by mild heating to drive off gases occluded on the metal or metal alloy particles. After this step is completed, annular chamber 18 and interfacial space 14 are under vacuum and glass envelope 16 is completely sealed.

The alloy powder is next consolidated using the CAP ® process as disclosed in U.S. Pat. No. 4,227,927, entitled "Powder Metallurgy," which issued to Herbert L. Black et al. on Oct. 14, 1980, herein incorporated by reference. Black et al. (in claim 1, col. 4, lines 19-31) summarize the next steps to be taken as follows:

"(d) placing the mold in an open top refractory container and packing with free refractory powder selected to freely flow at all the temperatures encountered in the process, (e) heating the mold and contents of the mold to a temperature at which sintering of the powder metal takes place and holding at this temperature for a time sufficient to cause substantially complete densification of the powder metal, (f) cooling and removing the mold to recover a dense article, and whereby the glass mold is supported by the free flowing refractory powder as the mold becomes plastic and shrinks in volume as its contents densify."

The CAP® processing results in the metal alloy powders being sintered into solid alloy masses with densities as high as 99 percent of theoretical.

During CAP® processing, the powders densify into a cylindrical solid wall or tube 30 (see FIG. 2) that is of reduced diameter and length, exerting a force upon the glass sleeve 12. In the course of this event the glass sleeve 12 also reduces in diameter and compresses against the solid graphite core 10. As a result of this process, the glass sleeve 12 forms into a glass liner 32 (see FIG. 2) for the solid metal or metal alloy tube 30. The final inner diameter of the glass liner 32 is determined by the outer diameter of the incompressable solid graphite core 10.

Figures 2, 3:
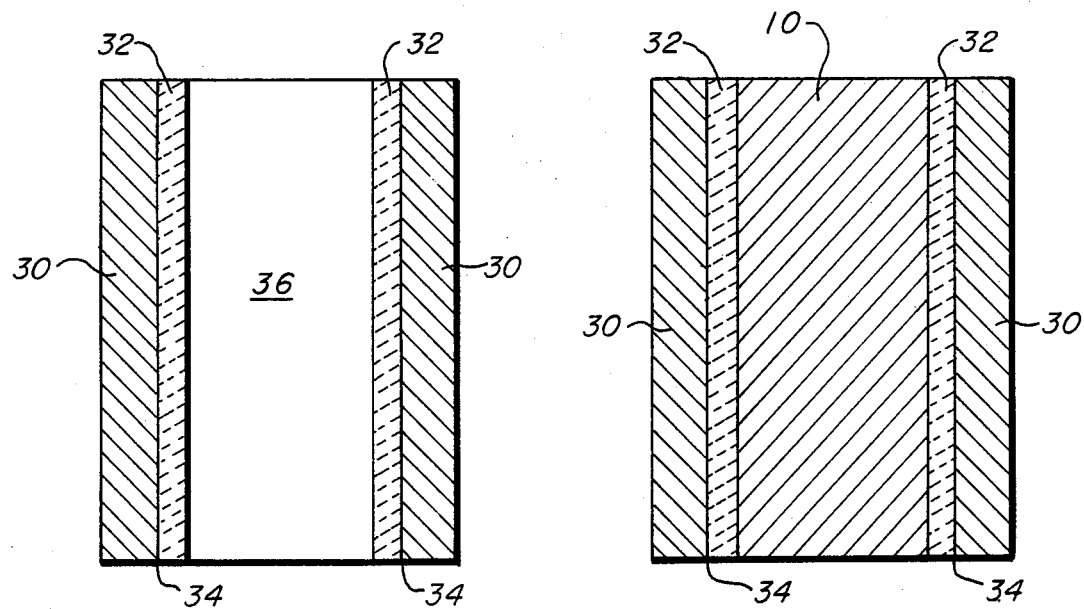
FIG. 2, shows a cross-sectional view of a typical alloy-glass-graphite composite structure produced by the consolidation step in the method of this invention.
FIG. 3 shows a cross-sectional view of a typical glass lined pipe which results from removing the graphite core.

Upon cooling from the sintering temperature the glass envelope 16 (see FIG. 1) self strips due to the differential rates of contraction of the metal or metal alloy and the glass. Referring to FIG. 2, the glass liner 32 is internally restrained by the graphite core 10 and it is externally loaded by the very substantial compressive forces imposed on it by the solid metal or metal alloy tube 30. Consequently the glass liner 32 remains solid and does not fracture during cooling from sintering temperature.

Referring again to FIG. 1, if the air in the interfacial space 14 between the graphite core 10 and the glass sleeve 12 is sealed or trapped in, it will expand during the consolidation process and will push the glass sleeve 12 away from the graphite core 10, leaving an enlarged interfacial space 14. The glass liner 32 formed in the consolidation step will then not be under the compressive forces and will break away from the solid metal or metal alloy tube 30 just as the glass envelope 16 does. Again, this is prevented by leaving space 14 in communication with chamber 18 so that air may freely flow from space 14 to chamber 18. As a result, space 14 will also be under vacuum and the glass sleeve 12 will be compressed by the consolidated metal or metal alloy tube 30 against the solid graphite core 10 as is necessary.

Drilling out the smooth surfaced graphite core 10 leaves a tubular pipe as shown in FIG. 3 comprising the smooth surfaced glass liner 32 and the metal or metal alloy tube 30. There is also a very thin interfacial fused layer 34 of glass and metal or metal alloy between the glass liner 32 and the metal or metal alloy tube 30. The unrelieved compressive forces on the glass liner 32 make the composite structure exceedingly resistant to fracture. This was demonstrated by repeated blows of a ball pen hammer on the outer wall of the metal or metal alloy tube 30 and directly on the glass liner 32 which achieved at most a slight chipping of the glass. Massive fracture such as would enable removal of the glass to obtain an only metal or metal alloy sleeve could not be achieved. Even quenching the composite pipe from a temperature of 650° C. into cold water did not produce a fracture of the glass liner.

For even greater metal or metal alloy density and greater compression on the glass liner, a modification of the CAP® process may be used. This procedure is disclosed in U.S. Pat. No. 4,564,501, entitled "Applying Pressure While Article Cools," which issued on Jan. 14, 1986, to David Goldstein, herein incorporated by reference. Goldstein (col. 3, line 16–29) summarizes this modification to the CAP® process as follows:

"Another application of this slow cooling under pressure modification is to obtain greater density in the nickel-titanium alloys objects than can be obtained by the unmodified CAP® process. The conventional CAP® process is used up to the cooling step. The clay-graphite container (including refractory powder, glass molds, nickel-titanium alloy object) is transferred directly to an insulated container which is placed in a pressure chamber. The insulated container is not air tight so that the pressure in the chamber will be felt on the glass molds. A pressure of 15,000 psi or more, preferably 40,000 psi or more, and more preferably from 100,000 to 200,000 psi is applied during cooling. In this manner, a high density product is achievable without hot working."

Glasses which do not react appreciably with the metal alloy and which are plastic at the sintering temperature may be used in the method of this invention. The glasses should also be resistant to chemicals and to physical erosion. Borosilicate glasses are examples of suitable glasses.

The solid graphite core 10 provides a strong, incompressable solid surface against which the glass sleeve 12 is compressed. The graphite core 10 may be hollow as long as it provides such a solid surface for the glass sleeve 12. Note that the smoothness of the glass liner 32 of the final tube or pipe product will match the smoothness of the surface of the graphite core 10. Therefore, to produce a smooth low friction glass liner, a graphite core with a correspondingly smooth outer surface must be used.

By selecting appropriate sintering times and temperatures, a wide variety of metals and alloys may be used in the method of this invention. A preferred group of alloys is the NITINOL family of alloys. The NITINOL alloys have excellent oxidation resistance even at 800° F. Specific examples of NITINOL alloys which may be used in the present method include those containing from 38 to 47, and preferably from 42 to 46 weight percent of titanium, from zero to about 6 weight percent of an additive metal which is cobalt, iron, or mixtures thereof, with the remainder of the alloy being nickel. When the additive metal is omitted (zero weight percent) the alloy is binary (Ti-Ni). A small amount of other elements may be present without significantly affecting the properties of the NITINOL alloys.

For NITINOL alloys the preferred particle size is $-60$ mesh with $-100$ mesh being more preferred. For other metals and alloys particle size may be varied according to the diffusion constant at the sintering temperature and the properties desired in the final product.

This process is not limited to the production of cylindrical tubes and pipes. By selecting different shaped graphite cores 10, glass sleeves 12, and glass molds or envelopes 16, a wide variety of shapes may be produced. For example, round cornered triangular, round cornered rectangular, round cornered pentagonal, round cornered hexagonal, round cornered octagonal conduits are possible. Similarly, tapered tubes or funnels may be produced. Even irregular shapes may be produced by this process.

Note that if the graphite core 10 is not removed, the composite structure (see FIG. 2) produced by the method of this invention is a co-axial electrical conductor with a dielectric interface.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method of producing a glass-lined metal pipe comprising:
   (a) loading unconsolidated metal or metal alloy powder into a sealable glass mold comprising a graphite core, a glass sleeve slipped over the graphite core with a sliding fit, a sealable outer glass envelope surrounding the graphite core and glass sleeve and forming with them a sealable chamber for the metal or metal alloy powder, wherein the glass is a type which becomes plastic when heated;
   (b) evacuating the atmosphere from the metal or metal alloy powder filled chamber in the mold;
   (c) sealing the chamber;
   (d) placing the mold in an open top refractory container and packing with free flowing refractory powder selected to freely flow at all the temperatures in the process;
   (e) heating the mold and the metal or metal alloy contents of the mold to a temperature at which sintering of the metal or metal alloy powder takes place and holding at this temperature for a time sufficient to cause substantially complete densification of the powered metal or metal alloy, during which step the mold is supported by the free flowing refractory powder as the glass sleeve and the glass envelope become plastic and the mold shrinks in volume as its metal or metal contents densify putting pressure against the plastic glass sleeve which is compressed against the solid graphite core;
   (f) cooling and removing the glass envelope portion of the mold to leave a composite article comprising the consolidated metal or metal alloy layer, a glass liner under compression from the consolidated metal or metal alloy layer, a very thin interfacial fused layer of glass and metal or metal alloy, and the graphite core; and
   (g) removing the solid graphite core from the composite article produced in step (f) to produce the glass-lined metal or metal alloy pipe.

2. The method of claim 1 which further comprises after step (e) but before step (f), transferring the open top refractory container, refractory powder, and mold directly into an insulated, refractory lined covered container and then placing the covered container into a pressure chamber and applying an isostatic pressure of 2,000 psi or more to the mold while it slowly cools down.

3. The method of claim 1 wherein the glass used is a borosilicate glass.

4. The method of claim 1 wherein an unconsolidated metal alloy powder comprising from 38 to 47 weight percent of titanium, from zero to 6 weight percent of an additive metal selected from the group consisting of cobalt, iron, and mixtures thereof, with the remainder of the alloy being essentially nickel.

5. The method of claim 4 wherein the alloy comprises from 42 to 46 weight percent of titanium.

6. The method of claim 4 wherein the weight percent of additive metal in the alloy is zero.

* * * * *